United States Patent [19]

Tanasawa et al.

[11] 3,744,250
[45] July 10, 1973

[54] AFTER-BURNER FOR AN INTERNAL COMBUSTION ENGINE

[75] Inventors: Yasushi Tanasawa, Miyagi; Tokuta Inoue, Shizuoka; Hidetaka Nohira, Shizuoka; Mitsumasa Yamada, Shizuoka, all of Japan

[73] Assignee: Toyota Jidosha Kogyo Kabushiki Kaisha, Tokyo, Japan

[22] Filed: Feb. 17, 1971

[21] Appl. No.: 116,028

[30] Foreign Application Priority Data
Feb. 21, 1970 Japan.............................. 45/14893

[52] U.S. Cl. ............................... 60/303, 23/277 C
[51] Int. Cl. ............................................. F01n 3/14
[58] Field of Search................ 60/286, 303, 307, 60/39.82 P; 23/277 C; 431/5, 9, 173, 352, 353

[56] References Cited
UNITED STATES PATENTS 2,847,826  8/1958  Howes ........................... 60/39.82 P
3,073,684  1/1963  Williams ............................. 60/303
3,360,927  1/1968  Cornelius ............................ 60/303
3,577,728  5/1971  Brimer ................................ 60/283
3,567,399  3/1971  Altmann ........................... 23/277 C

FOREIGN PATENTS OR APPLICATIONS 1,004,785  9/1965  Great Britain ....................... 60/203

Primary Examiner—Douglas Hart
Attorney—Toren and McGeady

[57] ABSTRACT

An after-burner for an internal combustion engine comprising a vortex combustion chamber producing flames in spiral form or rotary columnar form, a reactor, a flame inlet port for maintaining said vortex combustion chamber and said reactor in communication with each other, and an exhaust gas inlet pipe connected to said reactor for introducing exhaust gas of the engine thereinto.

1 Claim, 4 Drawing Figures

INVENTORS
YASUSHI TANASAWA
TOKUTA INOUE
HIDETAKA NOHIRA
MITSUMASA YAMADA
BY Toren and McGeady
ATTORNEYS

AFTER-BURNER FOR AN INTERNAL COMBUSTION ENGINE

This invention relates to after-burners for internal combustion engines, and more particularly it is concerned with an after-burner which is adapted to subject to cause the unburned components exhausted from the internal combustion engine to undergo recombustion, so that the exhaust gas can be purified.

A principal object of this invention is to provide an after-burner for an internal combustion engine which permits to cause those components of exhaust gas of the engine which have not been completely burned yet to undergo perfect combustion, irrespective of the operation condition of the engine.

Another object of the invention is to provide an exhaust gas purifier for an internal combustion engine which uses, as an ignition source, powerful and stable flames which burn continuously, not intermittently.

A further object of the invention is to provide an after-burner which is effective to prevent flames from being blown off when they are once produced, even if there are large fluctuations in the amounts of exhaust gas and the amounts of combustible components of the exhaust gas, so that no special flame holding means is required.

Heretofore, an ignition plug has been used in an after-burner of the type described as an ignition source for igniting and causing the unburned components in exhaust gas to burn. Ignition plugs of the prior art have had disadvantages in that the thermal energy produced by them is not sufficiently high to ignite the gas at once, and that the flames produced by ignition of gas are unstable and liable to be blown off. It has thus been required to carry out ignition repeatedly, and moreover, it has been necessary to provide flame holding means in the re-combustion chamber. After-burners of the prior art have been low in exhaust gas purifying efficiency in spite of these various devices for improving their performance.

The present invention obviates the aforementioned disadvantages of the prior art. According to this invention, there is provided an after-burner for an internal combustion engine which uses, as an ignition source, powerful and stable flames produced by vortex combustion means, so that exhaust gas of the engine can readily be ignited and burned completely, irrespective of the operation condition of the engine. The invention is characterized in that the flames produced by ignition are never blown off and the exhaust gas is completely purified.

Additional objects as well as features and advantages of this invention will become evident from the description set forth hereinafter when considered in conjunction with the accompanying drawings, in which.

Figure 1:
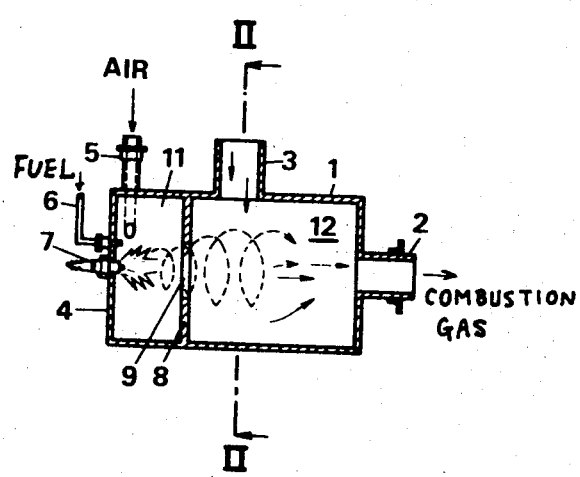
FIG. 1 is a longitudinal sectional side view of one embodiment of this invention.
Figure 2:
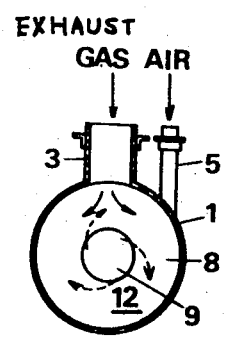
FIG. 2 is a sectional view taken along the line II—II of FIG. 1.

Various embodiments of the invention will now be described with reference to the accompanying drawings. In FIG. 1, the after-burner comprises a case 1 to which are connected a combustion gas outlet pipe 2 for discharging exhaust gas therethrough after exhaust gas of the engine is introduced into the case 1 for re-combustion, an engine exhaust gas inlet pipe 3 for introducing into the case 1 a mixture of air for re-combustion and the exhaust gas of the engine, and a main body 4 of vortex combustion means for producing flames.

The main body 4 of vortex combustion means is cylindrical in shape. An air inlet pipe 5 is connected tangentially to the cylindrical wall of the means main body 4.

A fuel inlet pipe 6 for the fuel to be burned in the vortex combustion means and an ignition plug 7 are secured to a rear wall of the main body 4.

In the embodiment shown in FIG. 1, the main body 4 of vortex combustion means is separated from the after-burner case 1 by a partition wall 8. The main body 4 of vortex combustion means and the after-burner case 1 as separated by the partition wall 8 which is equipped with a flame inlet port 9 therein form a vortex combustion chamber 11 and a reactor 12 respectively. In FIG. 1, an air pump for combustion, exhaust pipe of the engine, fuel supply pump, power source for the plug are omitted because they are of known structure.

Ignition and combustion of combustible exhaust gas of the engine will be explained with reference to FIG. 1. Air for combustion is mixed with the exhaust gas by means of the air supply pump, and the gas mixture is introduced radially into the reactor 12 through the exhaust gas inlet pipe 3. At the same time, the fuel supplied through the fuel inlet pipe 6 is mixed with the air supplied through the air inlet pipe 5, and the mixed gas is ignited by the ignition plug 7 and burns to produce flames in spiral form or rotating columnar form which are injected through the flame inlet port 9 into the reactor 12 to ignite and burn the combustible exhaust gas from the engine therein.

The flame in vortex form has thermal energy which is so high that the combutible exhaust gas in the reactor 12 is instantly ignited without any explosive sound and the temperature of flame projected into the reactor is also so high that combustible components of the exhaust gas, such as carbon monoxide, unburned hydrocarbons and the like, undergo perfect combustion and the combustion gas is discharged from the case 1 through the combustinon gas outlet pipe 2.

The flames produced in the vortex combustion chamber 11 are powerful and stable, so that the spark plug 7 has only to be actuated at the initial stages of ignition and combustion.

Figure 3:
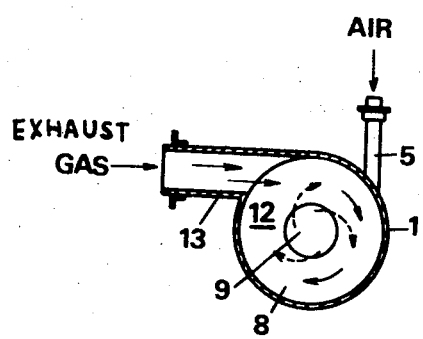
FIG. 3 is a sectional view similar to FIG. 2 of another embodiment of the invention.

In the embodiment shown in FIG. 3, the engine exhaust gas inlet pipe 3 is connected tangentially to the cylindrical wall of the reactor 12, so that the mixture of engine exhaust gas and air is introduced tangentially into the reactor 12 and ignited by axially flowing flames in the reactor 12 so as to form re-combustion flames flowing along the central portion of the reactor 12.

Figure 4:
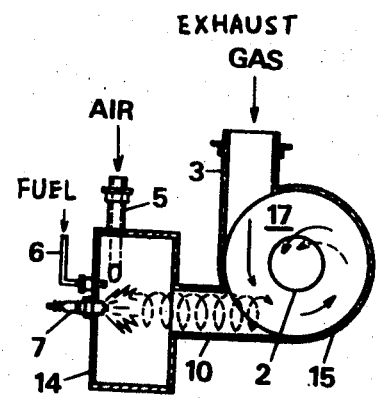
FIG. 4 is a longitudinal sectional side view of still another embodiment of the invention.

In the embodiment shown in FIG. 4, the main body 4 of vortex combustion means is formed separately from the after-burner case 1, with the former maintaining communication with the latter through a flame conduit 10. The combustible exhaust gas supplied through the exhaust gas inlet pipe 3 is introduced tangentially into the reactor 12 in the after-burner case 1, and the ignition flames are also introduced tangentially into the reactor 12 through the inlet port 9. This arrangement permits to effect perfect mixing of the combustible exhaust gas with flames at the peripheral part of the reactor, so that a large amount of thermal energy is given by the flames to the exhaust gas and ignition and re-combustion of the combustible exhaust gas are promoted.

From the foregoing description, it will be appreciated that the present invention permits to cause combustible components of the exhaust gas of an internal combustion engine to undergo perfect combustion, irrespective of the operation condition of the engine. The flames used for igniting and burning the exhaust gas of the engine in the present invention are so powerful and stable that they are never blown off, and facilitate ignition of the engine exhaust gas to cause the same to undergo re-combustion. Moreover, the flames enable the engine exhaust gas to burn very rapidly, thereby permitting to attain the objects of the present invention.

What we claim is:

1. An after-burner for an internal combustion engine comprising, in combination, a cylindrical combustion chamber including a cylindrical wall and having a first axial end and a second axial end, fuel inlet means and fuel ignition means located at said first end, air inlet means located in the cylindrical wall of said combustion chamber to direct inlet air into said combustion chamber tangentially thereof to form the combustion gases therein in a vortex pattern, a cylindrical reaction chamber inluding a cylindrical wall, inlet means located on the cylindrical wall of said reaction chamber to direct exhaust gasses from said internal combustion engine thereinto, restricted flow means arranged between said second axial end of said combustion chamber and said reaction chamber to direct combustion gases from within said combustion chamber into said reaction chamber to effect burning therein in a vortex pattern of said internal combustion engine exhaust gases, said restricted flow means being arranged on the cylindrical wall of said reaction chamber to exhaust the combustion gases from within said combustion chamber into said reaction chamber in a direction tangentially thereof to promote said vortex combustion pattern therein, and outlet means for exhausting gases from said reaction chamber.

* * * * *